US012705723B2

(12) United States Patent
Dwivedi et al.

(10) Patent No.: US 12,705,723 B2
(45) Date of Patent: Aug. 11, 2026

(54) METHOD AND SYSTEM FOR DATA GENERATION

(71) Applicant: Honda Motor Co., Ltd., Tokyo (JP)

(72) Inventors: Isht Dwivedi, Mountain View, CA (US); Kwonjoon Lee, San Jose, CA (US); Cristian Plop, Emeryville, CA (US); Katherine Yang Xu, Wayne, PA (US)

(73) Assignee: Honda Motor Co., Ltd., Tokyo (JP)

( * ) Notice: Subject to any disclaimer, the term of this patent is extended or adjusted under 35 U.S.C. 154(b) by 282 days.

(21) Appl. No.: 18/586,001

(22) Filed: Feb. 23, 2024

(65) Prior Publication Data

US 2025/0078245 A1 Mar. 6, 2025

Related U.S. Application Data

(60) Provisional application No. 63/579,893, filed on Aug. 31, 2023.

(51) Int. Cl.
*G06T 7/00* (2017.01)
*G06V 10/44* (2022.01)
(Continued)

(52) U.S. Cl.
CPC ............ *G06T 7/0008* (2013.01); *G06V 10/44* (2022.01); *G06V 10/764* (2022.01); *G06V 20/582* (2022.01); *G06V 2201/07* (2022.01)

(58) Field of Classification Search
CPC .... G06V 10/44; G06V 10/764; G06V 20/582; G06V 2201/07; G06V 10/82; G06T 7/0008; G06T 11/00; G06N 3/096
See application file for complete search history.

(56) References Cited

U.S. PATENT DOCUMENTS

2021/0390682 A1* 12/2021 Lin .......................... G06N 3/09
2022/0292685 A1* 9/2022 Heisler ................ G06N 3/0895
(Continued)

OTHER PUBLICATIONS

Trpković, A., Šelmić, M., & Jevremović, S. (2021). Model for the identification and classification of partially damaged and vandalized traffic signs. KSCE Journal of Civil Engineering, 25(10), 3953-3965. https://doi.org/10.1007/s12205-021-1796-9 (Year: 2021).*
(Continued)

*Primary Examiner* — John Villecco
*Assistant Examiner* — Kyla Guan-Ping Tiao Allen
(74) *Attorney, Agent, or Firm* — Rankin, Hill & Clark LLP

(57) ABSTRACT

A system for generating a dataset of damaged signs includes at least one computer configured to receive a first set of image data indicating damaged signs from a first set of classes and undamaged signs from a second set of classes, receive class information indicating a class type for each sign, and receive damage information indicating a damage type for each of the damaged signs. The at least one computer is also configured to process the first set of image data, the class information, and the damage information with a learning algorithm to produce output features, and generate output image data indicating an output sign from the second set of classes using a generative diffusion model that processes the output features, where the output image data indicates a damage type matching the damage type of at least one of the plurality of damaged signs.

18 Claims, 5 Drawing Sheets

(51) Int. Cl.
*G06V 10/764* (2022.01)
*G06V 20/58* (2022.01)

(56) References Cited

U.S. PATENT DOCUMENTS

| | | | | |
|---|---|---|---|---|
| 2023/0153982 | A1* | 5/2023 | Gonzalez Diaz | G06V 10/82 382/100 |
| 2024/0062362 | A1* | 2/2024 | Wang | G06T 7/001 |
| 2025/0061583 | A1* | 2/2025 | Clever | G06V 10/774 |
| 2025/0069414 | A1* | 2/2025 | Otsu | G01S 7/526 |

OTHER PUBLICATIONS

Radoš, K., Downes, J., Pham, D.-S., & Krishna, A. (2022). End-to-end traffic sign damage assessment. 2022 International Conference on Digital Image Computing: Techniques and Applications (DICTA), 1-8. https://doi.org/10.1109/dicta56598.2022.10034587 (Year: 2022).*

Dong, Qingxiu et al. "A Survey on In-context Learning." (2022). https://arxiv.org/pdf/2301.00234.pdf.

Rombach, Robin et al. "High-Resolution Image Synthesis with Latent Diffusion Models." 2022 IEEE/CVF Conference on Computer Vision and Pattern Recognition (CVPR) (2021): 10674-10685. https://openaccess.thecvf.com/content/CVPR2022/papers/Rombach_High-Resolution_Image_Synthesis_With_Latent_Diffusion_Models_CVPR_2022_paper.pdf.

Zhang, Lvmin et al. "Adding Conditional Control to Text-to-Image Diffusion Models." 2023 IEEE/CVF International Conference on Computer Vision (ICCV) (2023): 3813-3824. https://arxiv.org/pdf/2302.05543.pdf.

* cited by examiner

METHOD AND SYSTEM FOR DATA GENERATION

The present application claims priority to U.S. Prov. Patent App. Ser. No. 63/579,893, filed on Aug. 31, 2023, which is titled with the same inventors and is expressly incorporated herein in its entirety by reference.

BACKGROUND

Known diffusion models are often practically trained for real world applications using relatively large datasets containing hundreds of millions of images. Such diffusion models are trained on relatively large datasets to provide sufficient information regarding structure and appearance of a large variety of objects necessary for adapting to real environments.

Conversely, diffusion models trained on insufficient datasets are ill-equipped for real world applications. Further, obtaining sufficient dataset information regarding rare scenarios of real environments for training a model is often impractical or impossible. As such, current diffusion model applications are often directed to relatively limited applications, for which training data collection is more readily available. Consequently, there is a demand for a system and method of generating datasets of rare scenarios for training diffusion models for broader real world applications.

BRIEF DESCRIPTION

According to one aspect, a system for generating a dataset of damaged signs includes at least one computer configured to receive a first set of image data indicating a plurality of damaged signs from a first set of classes, and a plurality of undamaged signs from a second set of classes. The at least one computer is also configured to receive class information indicating a class type for each sign in the plurality of damaged signs and the plurality of undamaged signs, and receive damage information indicating a damage type for each sign in the plurality of damaged signs. The at least one computer is also configured to process the first set of image data, the class information, and the damage information together with at least one machine learning algorithm to produce output features. The at least one computer is also configured to generate output image data indicating an output sign from the second set of classes using a generative diffusion model that processes the output features, where the output image data indicates a damage type matching the damage type of at least one of the plurality of damaged signs.

According to another aspect, a method for generating a dataset of damaged signs includes receiving a first set of image data indicating a plurality of damaged signs from a first set of classes, and a plurality of undamaged signs from a second set of classes. The method also includes receiving class information indicating a class type for signs in the plurality of damaged signs and the plurality of undamaged signs. The method also includes receiving damage information indicating a damage type corresponding to each sign in the plurality of damaged signs. The method also includes processing the first set of image data, the class information, and the damage information together with at least one machine learning algorithm to produce output features. The method also includes generating output image data indicating an output sign from the second set of classes using a generative diffusion model that processes the output features, where the output image data indicates a damage type matching the damage type of at least one of the plurality of damaged signs.

According to another aspect, a non-transitory computer readable storage medium storing instructions that, when executed by a computer having a processor, causes the processor to perform a method. The method includes receiving a first set of image data indicating a plurality of damaged signs from a first set of classes, and a plurality of undamaged signs from a second set of classes. The method also includes receiving class information indicating a class type for signs in the plurality of damaged signs and the plurality of undamaged signs, and receiving damage information indicating a damage type corresponding to each sign in the plurality of damaged signs. The method also includes processing the first set of image data, the class information, and the damage information together with at least one machine learning algorithm to produce output features. The method also includes generating output image data indicating an output sign from the second set of classes using a generative diffusion model that processes the output features, where the output image data indicates a damage type matching the damage type of at least one of the plurality of damaged signs.

DETAILED DESCRIPTION

Figure 1:
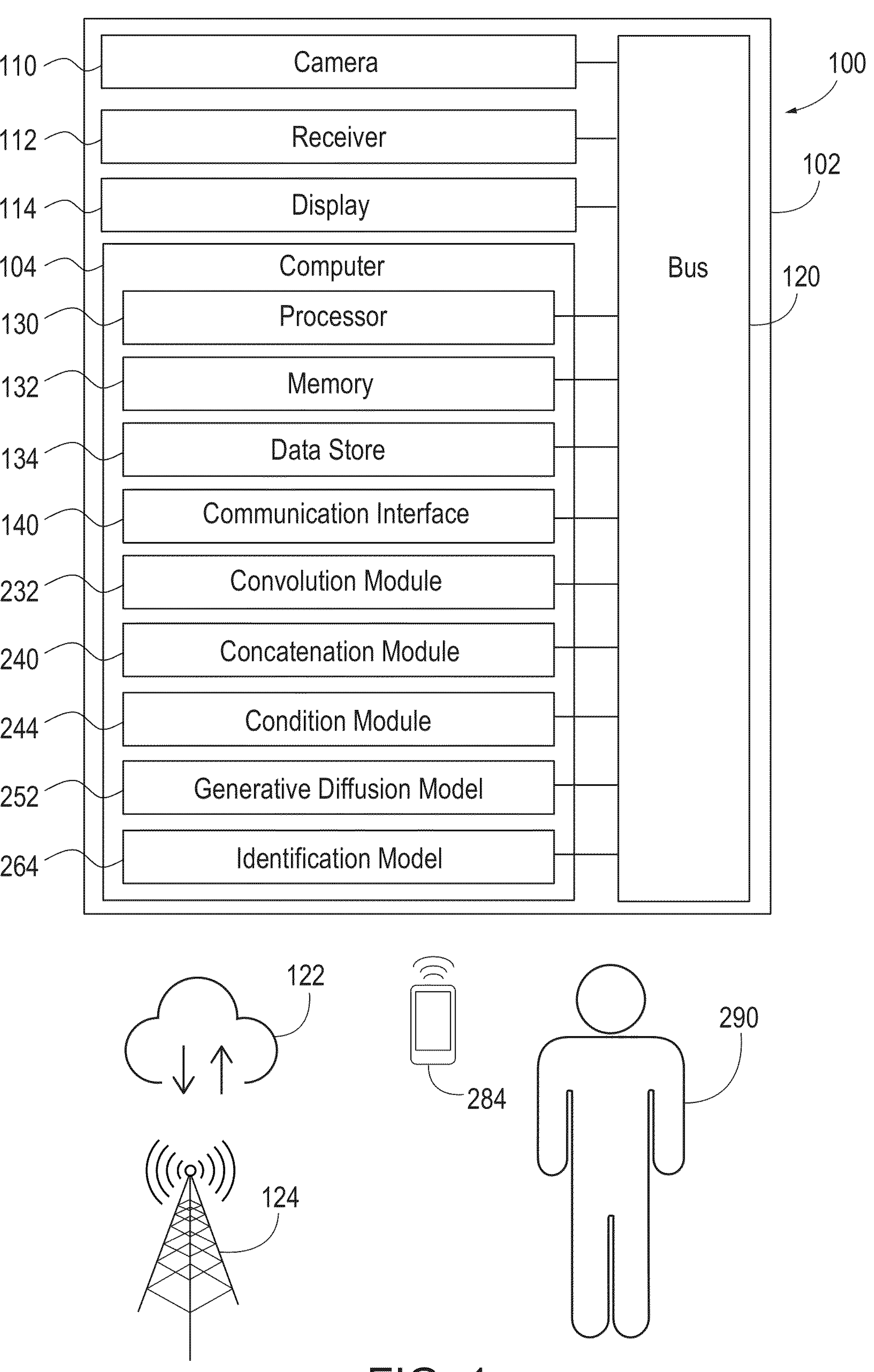
FIG. 1 is an exemplary operating environment of an information generation system.

The systems and methods disclosed herein are configured to generate image data of rare scenarios and build a dataset for training an identification model to identify rare scenarios in image data, such as damaged signs, captured by a camera. The system may be further configured to transmit notifications regarding sign damage to an external server via a network. An autonomous vehicle including the disclosed systems may navigate a path based on the captured image data.

DEFINITIONS

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Exemplary wearable computing devices can include, but are not limited to, watches, glasses, clothing, gloves, hats, helmets, visors, shirts, jewelry, rings, earrings necklaces, armbands, leashes, collars, shoes, earbuds, headphones and personal wellness devices.

System Overview

Referring now to the drawings, the drawings are for purposes of illustrating one or more exemplary embodiments and not for purposes of limiting the same. FIG. 1 is an exemplary component diagram of an operating environment 100 of a data generation system 102 including a computer 104, a camera 110, a receiver 112, and a display 114.

Each of the computer 104, the camera 110, the receiver 112, and the display 114 are operatively connected with each other and may be interconnected by a bus 120. The components of the operating environment 100, as well as the components of other systems, hardware architectures, and software architectures discussed herein, may be combined, omitted, or organized into different architectures for various embodiments.

The camera 110 is configured to generate image data, and transmit the image data to the computer 104. The camera 110 may include a combination of optical, infrared, or other cameras for generating the image data. The data generation system 102 may further include light detection and ranging (LiDAR) systems, position sensors, proximity sensors, and a variety of other sensors and sensor combinations similar to those found in known systems, including systems provided in vehicles for detecting signs, and therefore will not be described in detail.

The computer 104 is implemented as a part of the data generation system 102, and connected to an external server 122 via a network 124. The computer 104 may be capable of providing wired or wireless computer communications utilizing various protocols to send and receive electronic signals internally to and from components of the operating environment 100. Additionally, the computer 104 may be operably connected for internal computer communication via the bus 120 (e.g., a Controller Area Network (CAN) or a Local Interconnect Network (LIN) protocol bus) to facilitate data input and output between the computer 104 and the components of the operating environment 100.

The computing device 104 includes a processor 130, a memory 132, a data store 134, and a communication interface 140, which are each operably connected for computer communication via the bus 120. The communication interface 140 provides software and hardware to facilitate data input and output between the components of the computer 104 and other components, networks, and data sources described herein.

Figure 2:
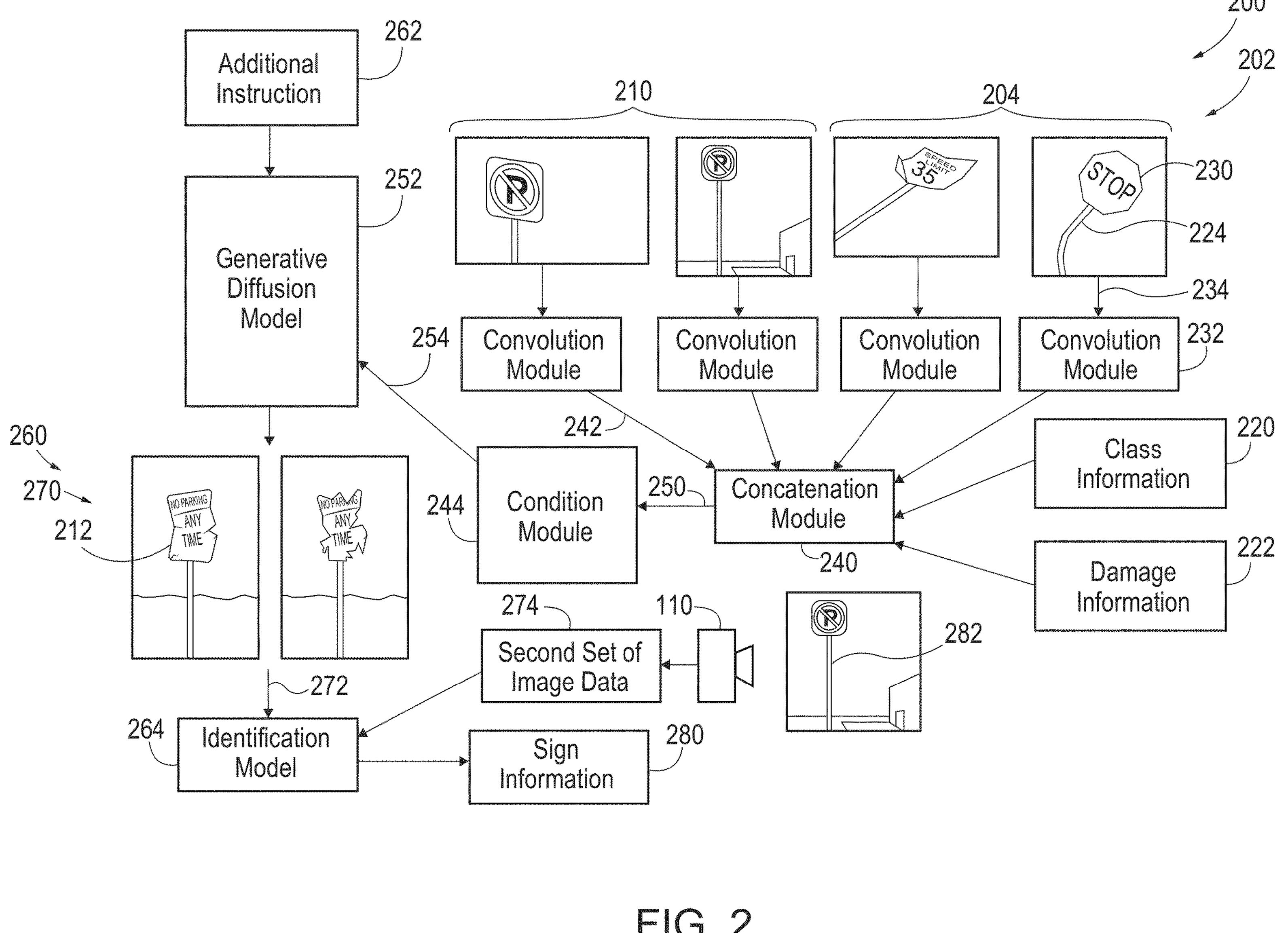
FIG. 2 is a diagram of a learning framework.

FIG. 2 depicts a learning framework 200 that incorporates the data generation system 102. The learning framework 200 includes a first set of image data 202 that indicates a plurality of damaged signs from a first set of classes 204, and a plurality of undamaged signs from a second set of classes 210. The computer 104 may receive the first set of image data 202 from the camera 110, the external server 122, the memory 132, and the data store 134.

While, as depicted, the first set of classes 204 includes no parking signs, and the second set of classes 210 includes speed limit signs and stop signs, each of the first set of classes 204 and the second set of classes 210 may include any one or combination of class types without departing from the scope of the present disclosure. Further, while the depicted sign types includes no parking signs, stop signs, and speed limit signs, the first set of classes 204 and the second set of classes 210 may each include a variety of sign types including turning signs, parking signs, prohibitory signs, hazard signs, warning signs, construction signs, custom text-based signs, custom image-based signs, highway markers, advertisements, rest area signs, and other signs accessible to vehicle or foot traffic without departing from the scope of the present disclosure.

In an embodiment, the first set of classes 204 and the second set of classes 210 are mutually exclusive with respect to class type. With this construction, as described in detail below, the data generation system 102 is configured to generate an output sign 212 having class types from the first set of classes 204, with damage types associated with the second set of classes 210.

The computer 104 is configured to receive class information 220 indicating a class type for each sign in the first set of image data 202, including the plurality of damaged signs from the first set of classes 204 and the plurality of undamaged signs from the second set of classes 210. The computer 104 is also configured to receive damage information 222 corresponding to the first set of image data 202 and the class information 220, the damage information 222 indicating a damage type for each sign in the plurality of damaged signs from the first set of classes 204. The damage type indicated in the damage information 222 corresponds to at least one of a support 224 and a main body 230 of signs from the first set of classes 204 being at least one of tilted, bent, broken, faded, and vandalized.

The computer 104 is configured to process the first set of image data 202, the class information 220, and the damage information 222 together with at least one machine learning algorithm to produce output features. In this regard, the learning framework 200 includes a convolution module 232 that is a first machine learning algorithm configured to extract image features from the first set of image data 202, indicated by arrows 234. In an embodiment, the convolution module 232 is a neural network configured to extract the image features from the first set of image data 202.

The computer 104 includes a concatenation module 240 configured to receive the image features extracted by the convolution module 232, the class information 220, and the damage information 222 as indicated by arrows 242. The concatenation module 240 is also configured to concatenate the received values, and input the concatenated values to a condition module 244, indicated by an arrow 250. The condition module 244 is a second machine learning algorithm configured to process the concatenated image features from the convolution module 232 with additional conditions regarding the class type and the damage type of the output sign 212 to be generated, to produce the output features. More specifically, the condition module 244 is a neural network structure, such as ControlNet, configured to control a generative diffusion model 252 by adding conditions regarding the class type and the damage type to produce the output features.

The learning framework 200 includes the generative diffusion model 252 configured for receiving the output features from the condition module 244, indicated by an arrow 254. The generative diffusion model 252 is also configured to generate output image data 260 indicating the output sign 212 based on the output features received from the condition module 244, and based on additional instruction 262 indicating a desired class type and damage type. The output image data 260 from the generative diffusion model 252 indicates the output sign 212 having a class type from the second set of classes 210, and having a damage type matching the damage type of at least one of the plurality of damaged signs in the first set of classes 204.

In an embodiment, the generative diffusion model 252 is a text-to-image deep learning model configured to receive the additional instruction 262 as a text embedding. The text embedding provided to the generative diffusion model 252 indicates the class type and the damage type of the output sign 212 to be generated, and corresponds to class types and damage types indicated in the first set of image data 202. In a further embodiment, the generative diffusion model 252 is Stable Diffusion or a similar latent diffusion model with a deep generative artificial neural network configured for receiving the output features from the condition module 244, receiving the additional instruction 262, and generating the output image data 260.

The learning framework 200 is configured to train an identification model 264 based on image data including the output image data 260 from the generative diffusion model 252 for processing sensor data to identify damaged signs in real world applications. In this regard, the generative diffusion model 252 is configured to generate a plurality of output signs 270 including the output sign 212 and received by the identification model 264, indicated by an arrow 272.

The generative diffusion model 252 may generate the plurality of output signs 270 to have a same class in the second set of classes 210, where each of the output signs indicate a damage type matching the damage type of at least one of the plurality of damaged signs in the first set of classes 204. The generative diffusion model 252 may further generate the plurality of output signs 270 to indicate a single damage type. As such, the generative diffusion model 252 may generate a dataset of output signs sufficient for training the identification model 264 to identify a sign of a specific class type having a specific damage type, as recorded by the camera 110.

The computer 104 may further generate the output image data 260 to indicate output signs from both the first set of classes 204 and the second set of classes 210, where the output image data 260 indicates a damage type for each of the output signs, and the damage type for each of the output signs matches a damage type of a damaged sign in the first set of classes 204. In an embodiment, the computer 104 generates the output image data 260 to indicate a plurality of signs for each class type and each damage type in the first set of image data 202. With this construction, the generative diffusion model 252 is configured to generate pluralities of output signs sufficient for training the identification model 264 to identify a sign having any combination of class types and damage types indicated in the first set of image data 202.

The identification model 264 is configured to receive image data recorded by the camera 110 as a second set of image data 274, and generate sign information 280 identifying a sign 282 in the second set of image data 274 using the identification model 264. The sign information 280 generated using the identification model 264 includes a class type and a damage type of the sign 282 identified in the second set of image data 274.

Referring back to FIG. 1, in an embodiment, the data generation system 102, including the computer 104 and the camera 110, is incorporated into a portable device 284. The portable device 284 is operatively connected to the external server 122 via the network 124, and configured to transmit a notification including the sign information 280 to the external server 122. A user 290 may operate the portable device 284, including the camera 110, through the display 114 as a user interface to generate image data of the sign 282. With this construction, the computer 104 may process image data on-site as captured by the camera 110, and send a notification to the external server 122 regarding the damaged sign 282 indicated in the sign information 280.

Figure 3:
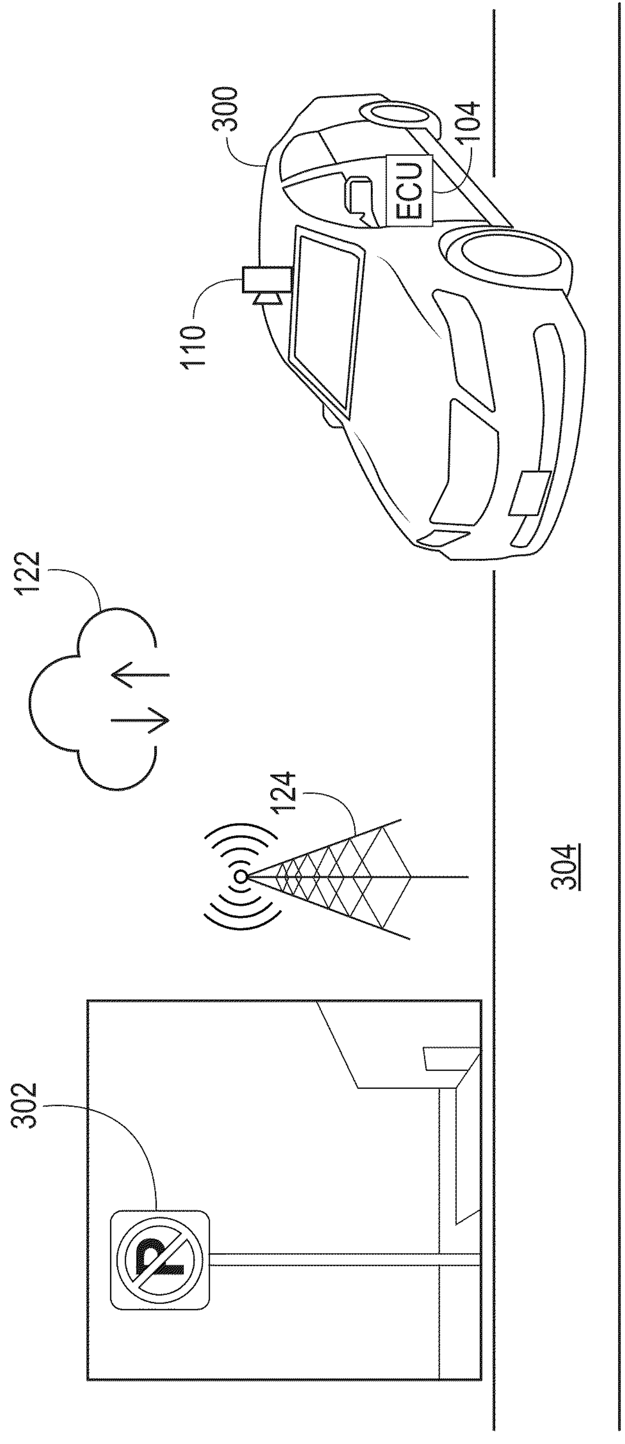
FIG. 3 is a diagram of an autonomous vehicle navigating a path using the information generation system.

FIG. 3 depicts an embodiment of the data generation system integrated into a vehicle 300 for identifying damaged traffic signs, sending notifications regarding damaged traffic signs to the external server 122, and causing the vehicle 300 to travel based on image data captured by the camera 110. In this regard, the vehicle 300 includes the camera 110 mounted thereon as an external sensor configured to capture image data indicating a surrounding environment of the vehicle 300. The vehicle 300 also includes the computer 104 as an electronic control unit (ECU) configured to actuate autonomous travel by the vehicle 300.

The camera 110 is configured to transmit the captured image data to the computer 104 as the second set of image data 274, where the computer 104 generates the sign information 280 based on the second set of image data 274. In this manner, the computer 104 and the camera 110 are configured to generate the sign information 280 as traffic sign information identifying a traffic sign 302 in the second set of image data 274, including a class and a damage type of the traffic sign 302 identified in the second set of image data 274.

In an embodiment, the computer 104 is configured to transmit a notification to the external server 122 indicating the sign information 280, where an interested party may access the sign information 280 and perform maintenance on the sign based on the sign information 280. In another embodiment, the vehicle 300 is an autonomous vehicle configured to navigate a path 304 based on the second set of image data 274, where the computer 104 causes the vehicle 300 to follow an instruction associated with the traffic sign 302 identified in the second set of image data 274.

Methods for Operating the Information Generation System

Figure 4:
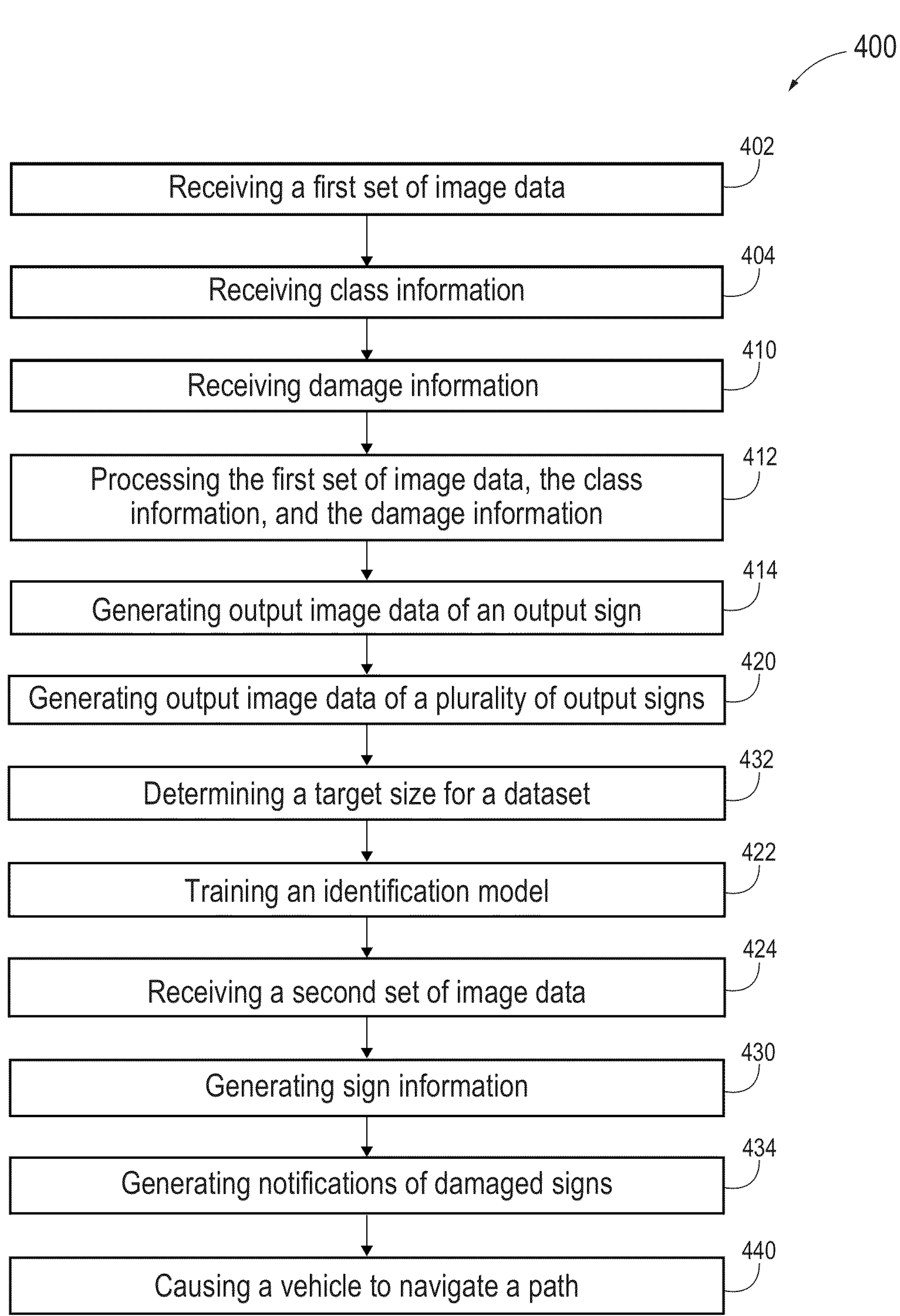
FIG. 4 is an exemplary process flow for generating a dataset, training a model, generating notifications, and operating the autonomous vehicle using the information generation system.

Referring to FIG. 4, a computer-implemented method for generating a dataset of damaged signs, training an identification model, identifying a damaged sign, transmitting a notification indicating a damaged sign, and causing a vehicle to navigate a path bath on the identified damaged sign will be described according to an exemplary embodiment. FIG. 4 will be described with reference to FIGS. 1-3. For simplicity, the method 400 will be described as a sequence of blocks, but the elements of the method 400 may be organized into different architectures, elements, stages, and/or processes.

At block 402, the method 400 includes receiving the first set of image data 202 indicating the plurality of damaged signs from the first set of classes 204. The first set of image data 202 also indicates the plurality of undamaged signs from the second set of classes 210. In an embodiment, the first set of classes 204 and the second set of classes 210 are mutually exclusive such that the first set of classes 204 lacks class types from the second set of classes 210, and the second set of classes lacks class types from the first set of classes 204.

At block 404, the method 400 includes receiving class information 220 corresponding to the first set of image data 202. The class information 220 indicates a class type for signs in the plurality of damaged signs and the plurality of undamaged signs in the first set of image data 202.

At block 410, the method 400 includes receiving damage information 222 corresponding to the first set of image data 202. The damage information 222 indicates a damage type corresponding to each sign in the plurality of damaged signs from the first set of classes 204.

At block 412, the method 400 includes processing the first set of image data 202, the class information 220, and the damage information 222 together with at least one machine learning algorithm to produce output features. More specifically, the method 400 includes extracting image features from the first set of image data with the convolution module 232 as the first machine learning algorithm. The method also includes concatenating the extracted image features with the class information 220 and the damage information 222 associated with the first set of image data 202. The method also includes processing the concatenated image features with the condition module 244 as the second machine learning algorithm. The condition module 244 processes the concatenated image features with added conditions regarding the class type and the damage type of the output sign 212 to be generated to produce the output features.

At block 414, the method 400 includes generating the output image data 260 indicating the output sign 212, where the generative diffusion model 252 processes the output features from the condition module 244 to generate the output image data 260. The output image data 260 from the generative diffusion model 252 indicates a damage type matching the damage type of at least one of the plurality of damaged signs from the first set of classes 204.

In an embodiment, the method 400 includes identifying a damaged sign in captured image data using a model trained with output image data 260 from the generative diffusion model 252. In this regard, at block 420, the method 400 further includes the generative diffusion model 252 generating the output image data 260 indicating the plurality of output signs 270, including the output sign 212. The plurality of output signs 270 generated by the generative diffusion model 252 are from a same class in the second set of classes 210. Each of the output signs in the plurality of output signs 270 indicate a damage type matching the damage type of at least one of the plurality of damaged signs in the first set of classes 204.

The plurality of output signs 270 includes signs having class types from the second set of classes 210, and damage types associated with the first set of classes 204. In this manner, the generative diffusion model 252 is configured to generate output signs based on the first set of image data 202, even when the first set of image data 202 lacks a specific example of a sign of a specific class type having a specific damage type.

Generating the output image data 260 at block 420 may include generating the output image data 260 to indicate the plurality of output signs 270 from both the first set of classes 204 and the second set of classes 210. In this regard, the output image data 260 indicates a damage type for each sign in the plurality of the output signs, and the damage type for each of the output signs matches a damage type of a damaged sign in the first set of classes 204.

At block 422, the method 400 includes training the identification model 264 for processing image data using the output image data 260 from the generative diffusion model 252. The identification model 264 is trained to identify a damaged sign recorded in image data transmitted from the camera 110.

At block 424, the method 400 includes receiving the second set of image data 274 from the camera 110. In this regard, image data generated by the camera 110 is transmitted to the computer 104 for initial processing by the convolution module 232.

At block 430, the method 400 includes generating the sign information 280 identifying the sign 282, 302 in the second set of image data 274 using the identification model 264. The sign information 280 indicates a class type and a damage type of the sign 282, 302 identified in the second set of image data 274.

In an embodiment, the method 400 includes generating a dataset having sufficient size and organization to train a model for real world applications that incorporate identifying damaged signs. In this regard, at block 432, the method 400 includes determining a target size for a dataset including signs having class types from the first set of classes 204 and the second set of classes 210.

The dataset to be generated includes subsets, where each subset is defined by a class type and a damage type. In an embodiment, each subset in the dataset to be generated is defined by a single class and a single damage type. With this construction, the identification model 264 trained based on the dataset is configured to identify specific classes of signs having specific types of damage. Determining the target size for the dataset at block 432 includes determining a target size for each subset in the dataset.

Referring back to block 420, the method 400 includes generating the output image data 260 for each subset of the dataset. In this regard, the generative diffusion model 252 repeatedly produces output signs, including the output sign 212, having class types and damage types matching the class types and the damage types defining the subsets in the dataset. At block 420, each subset is provided a sufficient quantity of the output image data 260 from the generative diffusion model 252 for training the identification model 264 to identify a damaged sign recorded by the camera 110.

At block 434, the method 400 includes generating notifications of damaged signs to the external server 122 over the network 124. In an embodiment, the computer 104 and the camera 110 are included in the vehicle 300 to identify damaged traffic signs in the surrounding environment of the vehicle 300. With this construction, the computer 104 is configured to inform interested parties who may perform maintenance on the damaged sign, or to update a database of damaged signs for reference by drivers or autonomously driven vehicles.

At block 440, the method 400 includes causing the vehicle 300 to navigate the path based on the second set of image data 274. In this regard, the computer 104 causes the vehicle 300 to follow an instruction associated with the traffic sign identified in the second set of image data 274.

Figure 5:
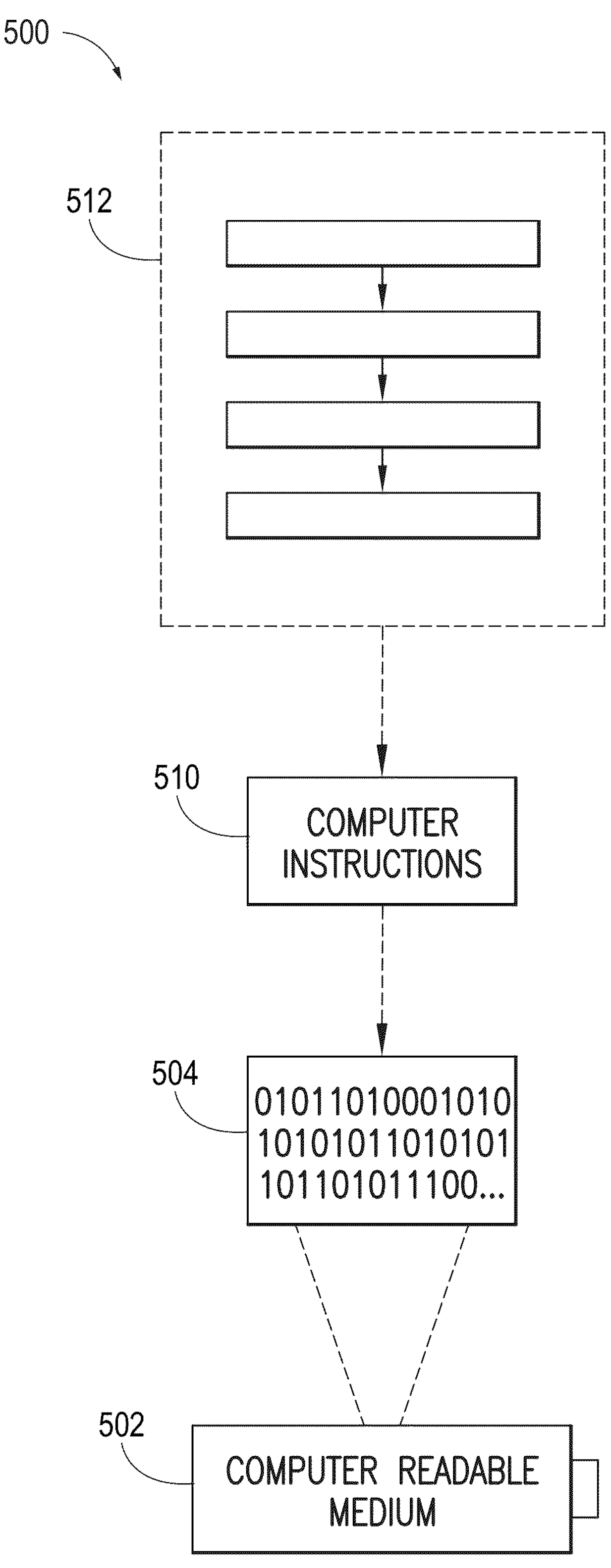
FIG. 5 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 5, where an implementation 500 includes a computer-readable medium 502, such as a CD-R, DVD-R, flash drive, a platter of a hard disk drive, etc., on which is encoded computer-readable data 504. This encoded computer-readable data 504, such as binary data including a plurality of zero's and one's as shown in 504, in turn includes a set of processor-executable computer instructions 510 configured to operate according to one or more of the principles set forth herein. In this implementation 500, the processor-executable computer instructions 510 may be configured to perform a method 512, such as the method 400 of FIG. 4. In another aspect, the processor-executable computer instructions 510 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for generating a dataset of damaged signs, the system comprising at least one computer configured to:

receive a first set of image data indicating a plurality of damaged signs from a first set of classes, and a plurality of undamaged signs from a second set of classes, wherein the first set of classes and the second set of classes are mutually exclusive with respect to class type such that the first set of classes lacks class types from the second set of classes and the second set of classes lacks class types from the first set of classes;

receive class information indicating a class type for each sign in the plurality of damaged signs and the plurality of undamaged signs;

receive damage information indicating a damage type for each sign in the plurality of damaged signs;

process the first set of image data, the class information, and the damage information together with at least one machine learning algorithm to produce output features; and generate output image data indicating an output sign from the second set of classes using a generative diffusion model that processes the output features, wherein the output image data indicates a damage type matching the damage type of at least one of the plurality of damaged signs, wherein the generative diffusion model generates the output sign from the second set of classes by applying the damage type learned from the first set of classes to a sign type of the second set of classes that is different from sign types of the first set of classes.

2. The system of claim 1, further comprising a camera operatively connected with the at least one computer, wherein the at least one computer is configured to:

generate the output image data indicating a plurality of output signs from a same class type in the second set of classes, wherein each of the output signs indicate the damage type matching the damage type of at least one of the plurality of damaged signs in the first set of classes;

train an identification model for processing image data using the output image data;

receive a second set of image data from the camera; and generate sign information identifying a sign in the second set of image data using the identification model, wherein the sign information indicates the class type and the damage type of the sign identified in the second set of image data.

3. The system of claim 2, wherein the at least one computer is a portable device operatively connected to an external server via a network, and configured to transmit a notification including the sign information to the external server.

4. The system of claim 2, in combination with a vehicle wherein the camera and the at least one computer are included in the vehicle to generate traffic sign information identifying a traffic sign in the second set of image data, including the class type and the damage type of the traffic sign identified in the second set of image data.

5. The combination of claim 4, wherein the vehicle is an autonomous vehicle configured to navigate a path based on the second set of image data, and the at least one computer includes an electronic control unit (ECU) configured to actuate autonomous travel by the vehicle, wherein the ECU causes the vehicle to follow an instruction associated with the traffic sign identified in the second set of image data.

6. The system of claim 1, wherein the at least one computer is configured to generate output image data indicating output signs from both the first set of classes and the second set of classes, wherein the output image data indicates the damage type for each of the output signs, and the damage type for each of the output signs matches the damage type of a damaged sign of the plurality of damaged signs in the first set of classes.

7. The system of claim 1, wherein the at least one machine learning algorithm includes a first machine learning algorithm configured to extract image features from the first set of image data, and the at least one computer is configured to concatenate the image features with the class information and the damage information to produce the output features.

8. The system of claim 7, wherein the at least one machine learning algorithm includes a second machine learning algorithm configured to process the concatenated image features from the first machine learning algorithm with added conditions regarding the class type and the damage type to produce the output features.

9. The system of claim 1, wherein the at least one machine learning algorithm includes a neural network structure configured to control the generative diffusion model by adding conditions regarding the class type and the damage type to produce the output features.

10. The system of claim 1, wherein the generative diffusion model processes the output features based on additional instruction that is a text embedding indicating the class type and the damage type of the output sign to be generated.

11. A method for generating a dataset of damaged signs, the method comprising:

receiving a first set of image data indicating a plurality of damaged signs from a first set of classes, and a plurality of undamaged signs from a second set of classes, wherein the first set of classes and the second set of classes are mutually exclusive with respect to class type such that the first set of classes lacks class types from the second set of classes and the second set of classes lacks class types from the first set of classes;

receiving class information indicating a class type for signs in the plurality of damaged signs and the plurality of undamaged signs;

receiving damage information indicating a damage type corresponding to each sign in the plurality of damaged signs;

processing the first set of image data, the class information, and the damage information together with at least one machine learning algorithm to produce output features; and generating output image data indicating an output sign from the second set of classes using a generative diffusion model that processes the output features, wherein the output image data indicates a damage type matching the damage type of at least one of the plurality of damaged signs, wherein the generative diffusion model generates the output sign from the second set of classes by applying the damage type learned from the first set of classes to a sign type of the second set of classes that is different from sign types of the first set of classes.

12. The method of claim 11, further comprising:

generating the output image data indicating a plurality of output signs from a same class type in the second set of classes, wherein each of the output signs indicate the damage type matching the damage type of at least one of the plurality of damaged signs in the first set of classes;

training an identification model for processing image data using the output image data;

receiving a second set of image data from a camera; and generating sign information identifying a sign in the second set of image data using the identification model, wherein the sign information indicates the class type and the damage type of the sign identified in the second set of image data.

13. The method of claim 12, further comprising transmitting a notification including the sign information to an external server via a network.

14. The method of claim 12, further comprising causing a vehicle to navigate a path based on the second set of image data, wherein the vehicle follows an instruction associated with a traffic sign identified in the second set of image data.

15. The method of claim 11, further comprising determining a target size for a dataset including signs having class types from the first set of classes and the second set of classes, including determining target sizes for subsets of the dataset, wherein each subset is defined by the class type and the damage type; and generating the output image data for each subset of the dataset.

16. The method of claim 11, further comprising generating the output image data indicating output signs from both the first set of classes and the second set of classes, wherein the output image data indicates the damage type for each of the output signs, and the damage type for each of the output signs matches the damage type of a damaged sign of the plurality of damaged signs in the first set of classes.

17. The method of claim 11, wherein processing the first set of image data, the class information, and the damage information together with the at least one machine learning algorithm includes:

extracting image features from the first set of image data with a first machine learning algorithm;

concatenating the extracted image features with the class information and the damage information; and processing the concatenated image features with a second machine learning algorithm, with added conditions regarding the class type and the damage type of the output sign to be generated, to produce the output features.

18. A non-transitory computer readable storage medium storing instructions that, when executed by a computer having a processor, causes the processor to perform a method, the method comprising:

receiving a first set of image data indicating a plurality of damaged signs from a first set of classes, and a plurality of undamaged signs from a second set of classes, wherein the first set of classes and the second set of classes are mutually exclusive with respect to class type such that the first set of classes lacks class types from the second set of classes and the second set of classes lacks class types from the first set of classes;

receiving class information indicating a class type for signs in the plurality of damaged signs and the plurality of undamaged signs;

receiving damage information indicating a damage type corresponding to each sign in the plurality of damaged signs;

processing the first set of image data, the class information, and the damage information together with at least one machine learning algorithm to produce output features; and generating output image data indicating an output sign from the second set of classes using a generative diffusion model that processes the output features, wherein the output image data indicates a damage type matching the damage type of at least one of the plurality of damaged signs, wherein the generative diffusion model generates the output sign from the second set of classes by applying the damage type learned from the first set of classes to a sign type of the second set of classes that is different from sign types of the first set of classes.

* * * * *